3,690,954
FUEL CELL AND ELECTROLYTE SUPPLY SYSTEM
Bernard Warszawski, Paris, and Henri Vandenberghe, Vincennes, France, assignors to Societe Generale de Constructions Electriques et Mecaniques (Alsthom), Paris, France
Filed Mar. 1, 1971, Ser. No. 119,796
Claims priority, application France, Mar. 2, 1970, 7007454
Int. Cl. H01m 27/02
U.S. Cl. 136—86
9 Claims

ABSTRACT OF THE DISCLOSURE

The marginal portions of thin, sheet-like electrodes and diaphragms are pierced to form, when the diaphragms and electrodes are assembled in alternately placed stacks, ducts and channels. The end plates holding the stack of electrodes together are formed with openings and ducts interiorly of the thickness thereof to interconnect the ducts and channels through the electrode-diaphragm stack in selected hydraulic circuits. Two distinct groups of ducts are provided, one in communication with the faces of the electrodes, at alternate sides, to permit application of electrolyte charged with oxidizing, or reducing-type reactants, respectively; the other group of ducts or channels is independent of the first group and non-communicating with the first set of ducts to provide for intercommunication of the electrolyte itself.

Cross reference to related patents and applications: U.S. Pats. 3,513,032; 3,516,866; 3,518,122; U.S. Ser. Nos. 708,302, filed Feb. 26, 1968, now abandoned; 708,338, filed Feb. 26, 1968, now abandoned, and its continuation-in-part application Ser. No. 123,110, filed Mar. 15, 1972; U.S. Ser. No. 70,636, filed Sept. 9, 1970, the disclosure of all of which is hereby incorporated by reference.

The present invention relates to fuel cells, and more particularly to a supply system for the supply and removal of electrolyte to a fuel cell battery, formed of a stack of individual fuel cell elements.

Batteries of the types herein referred to have been previously disclosed and reference is hereby made to French Pats. 1,137,800; 1,399,765; U.S. Ser. No. 708,302; U.S. Pat. 3,516,866; U.S. Pat. 3,530,003; U.S. Ser. No. 708,338; U.S. Pats. 518,122; 3,513,032; 3,511,713; U.S. Ser. No, 706,361; and French Pats. 1,586,128; 1,574,016; 1,584,577, the disclosure of which is hereby incorporated by reference. The disclosure of some of these reference patents, and the subject matter of some of them is contained in U.S. patents and applications, claiming priority from the aforementioned reference patents. All the above are assigned to the assignee of the present invention.

The present invention relates to the type of fuel cell battery in which an oxidizing-type reactant and a reducing-type reactant is, each, carried by an electrolyte and circulated to individual fuel cell elements of the fuel cell battery. A large number of elementary fuel cells are stacked together. Each individual fuel cell is formed of half-cells, comprising one side face of an electrode and an adjacent side face of a semi-permeable diaphragm. Upon alternate stacking of electrodes and diaphragms, an assembly of elementary cells will be formed, in which each half-cell is separated by a diaphragm. A network of ducts and channels is provided which interconnects all the half-cells of the same polarity with a unique inlet and outlet duct, adapted to be connected to have electrolyte supplied thereto, respectively charged with an oxidizing or reducing-type reactant, depending upon which side of the face of the electrode the electrolyte is applied to. The reactants are dissolved, emulsified, or dispersed in the electrolyte and are circulated over the faces of the electrodes, essentially parallel to the median plane of the electrode. Electrolyte having the reactant of one type dissolved, emulsified, or dispersed therein irrigates one face of the electrode forming a half-cell, the electrolyte charged with the other type of reactant being circulated to irrigate and wash over the other face of the electrode, essentially parallel to the plane of circulation of the electrolyte charged with the first reactant. The assembly of the fuel cells is interconnected by being locked between two end plates which connect the diaphragms and electrodes, if desired in spacer elements or frames, into one cohesive unit. The end plates are formed with passages in order to permit application of the electrolytes as carriers of the reactants to the electrodes, and to permit removal of spent electrolyte therefrom. These cells may operate in accordance with electrolytic cycles as described in some of the above-identified and referred to patents; and may utilize electrodes as described in some of the referred to patents.

It has previously been proposed (see French Pat. 1,535,744) to combine the supply and removal ducts of the reactants with the locking plates which interconnect the units into one compact battery. The plates are formed of two sets of locking plates, located at the end points of a fuel cell battery assembly and so arranged that they can be mechanically interconnected to form the battery stack. One of the plates of the set of the two forms an element which permits supply of electrolyte charged with reactant by being formed with two inlet ducts, or openings connecting with the supply channels within the battery stack. The other end plate of the set permits removal of the electrolyte from the battery stack by one or more outlet openings. The electrolyte and the reactants circulate in channels or ducts within the batery. The set of electrolyte supply plates is formed of a number of plates locked one against the other and cooperating together in such a manner that they, selectively, interconnect the supply ducts of the different type electrolytes, that is, of the electrolytes carrying the different reactants, to supply channels corresponding to the side of the electrode to be supplied; the set of removal plates, that is, the plates connected to the outlet from the electrolyte is likewise formed of one or more interlocked plate elements, connected together one against the other and so cooperating that, selectively, the removal ducts are interconnected from the outlet of the battery to one or more removal channels. Such an arrangement is comparatively complex since, at each end, several different plates must be carried which are superimposed above each other in order to ensure the necessary intercommunication between the ducts supplying and removing electrolyte to, or from the battery cells. This structure further requires that the inlet to the fluid should be at one side of the battery assembly, whereas the outlet of the electrolyte fluids is at the other side. The inlets of the electrolytes of different type are crossed with respect to the outlet, that is, the outlet of one type of fluid being at the left of the plate which has its corresponding inlet at the right side of the plate at the other end of the battery, and conversely, for the other type of electrolyte.

The foregoing structure, while satisfactory in many respects presents, however, the danger of leakage and cross-connection of the two different types of electrolyte; even small quantities of electrolyte carrying one of the reactants should be carefully separated from the electrolyte carrying the other reactant.

It is an object of the present invention to provide an electrolyte supply structure for use in a fuel cell battery of the type above referred to which provides a wide variety of choices for the inlet, as well as outlet connections of the electrolytes, which permits operation and supply of several fuel cells in series, and further the introduction of auxiliary or additional reactants, separately, or in an electrolyte carrier.

It is a further object of the present invention to provide a fuel cell structure having an electrolyte supply system in which the connections to the inlets, as well as the outlets can be made at different zones and, if desired, the inlets as well as the outlets of electrolyte of one type being provided at one side of the fuel cell, or all inlets and outlets being provided at one side of the cell; and further, to provide a structure in which only a single end or cover plate is needed, and which is simple to manufacture and versatile in application.

Subject matter of the present invention: Briefly, the present invention relates to a supply and removal system for electrolyte for fuel cells in which a large number of alternately stacked electrode elements and thin, sheet-like semi-permeable diaphragms are stacked above each other, with the electrodes and diaphragms being formed with marginal portions which are pierced to form ducts and channels when the electrodes and diaphragms are stacked together. The electrodes themselves form embossed, or goffered surfaces and are arranged to have the electrolyte wash over the faces thereof.

The end plates holding the stacks of electrodes together are formed with openings and ducts interiorly of the thickness of the end plates to interconnect the ducts formed by the openings through the electrode-diaphragm stack. The marginal zones of the electrodes and diaphragms are formed with a sufficient number of openings to provide two distinct groups of ducts: one, which is in communication with the faces of the electrodes, at alternate sides, to provide for application of oxidizing, or reducing-type electrolyte; and the other, independently and non-communicating with the first set of ducts being provided for communication of electrolyte itself. The end plates are formed not only with the ducts and channels, or cavities therein to provide intercommunication between the various ducts and channels longitudinally of the battery stack, but additionally with inlet and outlet openings to introduce electrolyte, electrolyte charged with different types of reactants, and to permit removal of electrolyte, of selected types.

The end plates are preferably similar, formed of a unitary molding of plastic material or the like, and already molded with connection openings for the supply and removal of electrolyte; if it is undesired to use selected openings, they may be plugged by screw plugs or the like.

The invention will be described by way of example with reference to the accompanying drawings, wherein.

Figure 1:
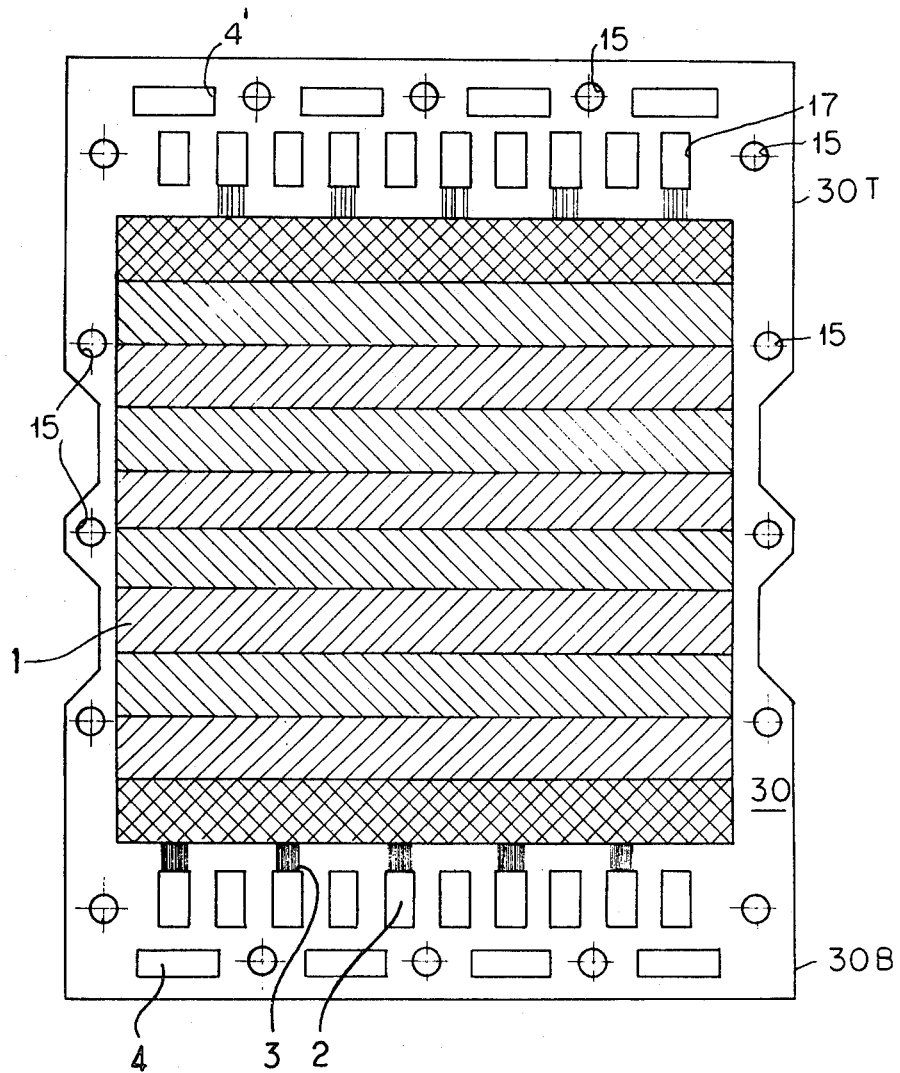
FIG. 1 illustrates, schematically, an electrode for assemby as a compact fuel cell battery, and showing openings pierced in marginal portions and arranged in accordance with the present invention.

The bi-polar electrode of FIG. 1 is a thin fluid-impervious metallic sheet formed with embossed zones projecting alternately from the median plane of the electrode, as disclosed and described in detail in application Ser. No. 123,110, filed Mar. 17, 1972, assigned to the assignee of the present invention, and continuation-in-part of applications Ser. No. 708,338 and Ser. No. 708,302, both now abandoned. The electrode 1 illustrated is of the type shown in application Ser. No. 70,636, in which the projections on one side of the electrode are formed as alternate, angled ridges, or as a lattice-type embossed network. A fuel cell battery is formed by stacking, alternately, electrodes 1 with thin, semi-permeable diaphragms 1' (FIG. 3) in alternate sequence. Openings 2, formed in the frames or marginal portions of the electrodes are connected by means of microgroove channels 3 to the faces of the electrodes themselves. An entire electrode element is thus formed of marginal portions 30 (FIG. 1) and the metallic bi-polar sheet 1. Marginal portions 30 may be of plastic, molded around electrode portion 1, and having the grooves 3 molded therein. The grooves 3 in turn terminate at the network of projections and depressions of the electrodes and interconnect a face of the electrode with the channels 2. Alternate channels are connected to grooves located at opposite sides of the electrodes. Oppositely placed marginal portions 30T and 30B are formed with the ducts respectively adapted to supply, and remove electrolyte from the face of the electrode. The electrolyte itself is a carrier for one, or more reactants, applied to the respective face of the electrode, in parallel with the median plane thereof. In the example of FIG. 1, the electrolyte washes over the face of the electrode 1 from the marginal portion 30B to the marginal portion 30T to be removed by removal ducts interconnecting with openings 17. The network of alternately ocurring projections and depressions may be continuous, or discontinuous, straight or curved, parallel or non-parallel, so long as an inclination angle is presented which differs from zero with rerespect to the margins of the electrodes. Preferably, the projections of two elementary adjacent networks on the same electrodes extend in different directions, such that the median direction of passage of electrolyte over the face of the electrode is essentially perpendicular to the margins of the electrodes from which the electrolyte is supplied and removed.

In accordance with the present invention, the marginal portions 30B and 30T are not only formed with the supply and removal ducts 2, 17, but additionally with openings 4, 4' forming, when stacked together, longitudinal ducts generally indicated at 5 (FIG. 3) and specifically 5B (FIG. 2) at the bottom and 5L and 5R at the upper left and upper right, respectively. These ducts are additionally connected to end plates to provide for intercommunication of the electrolyte. Openings 4, 4', when stacked together, are in alignment so that the ducts generally indicated at 5 extend longitudinally through the battery assembly, perpendicular to the median plane of the individual elements. Ducts 5 do not communicate with any space interiorly of the ducts within the elementary half-cells of the fuel cell battery.

Figure 2:
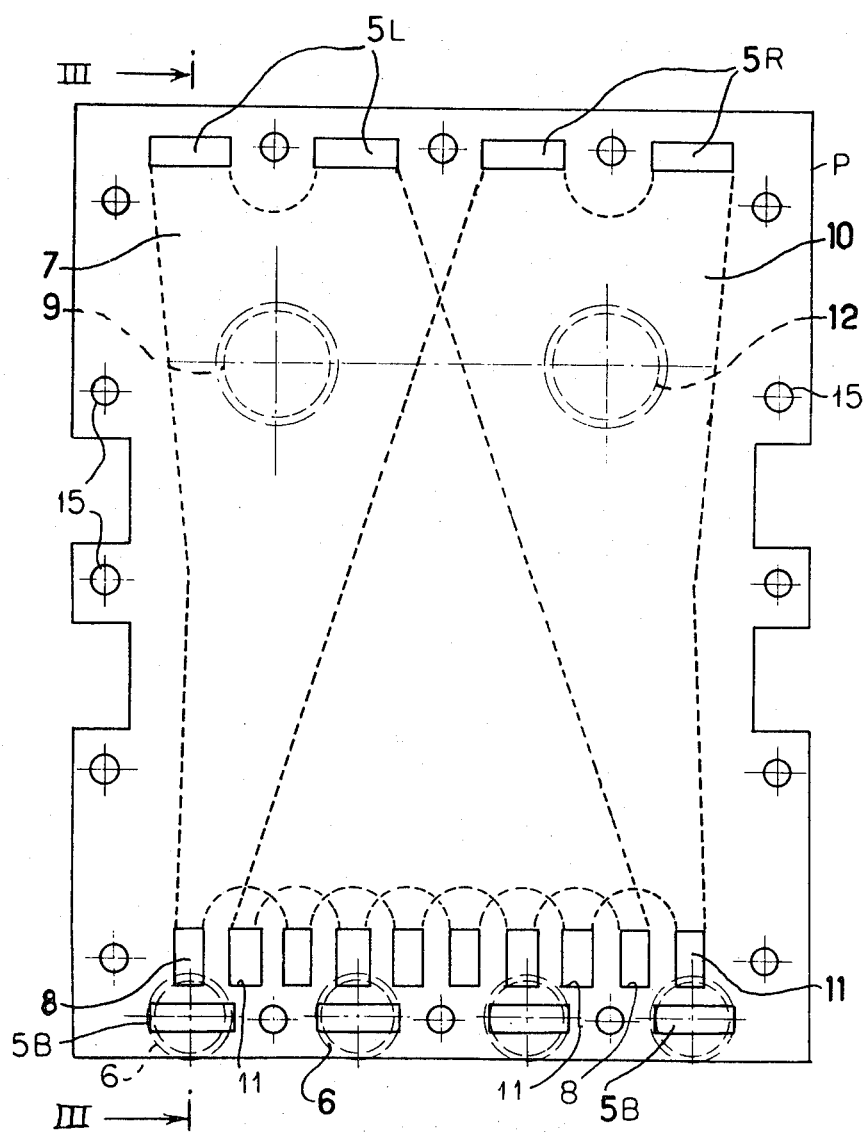
FIG. 2 is an end plan view of an end plate for a stack of electrodes as seen in FIG. 1, and diaphragms having similar openings pierced therethrough.
Figure 3:
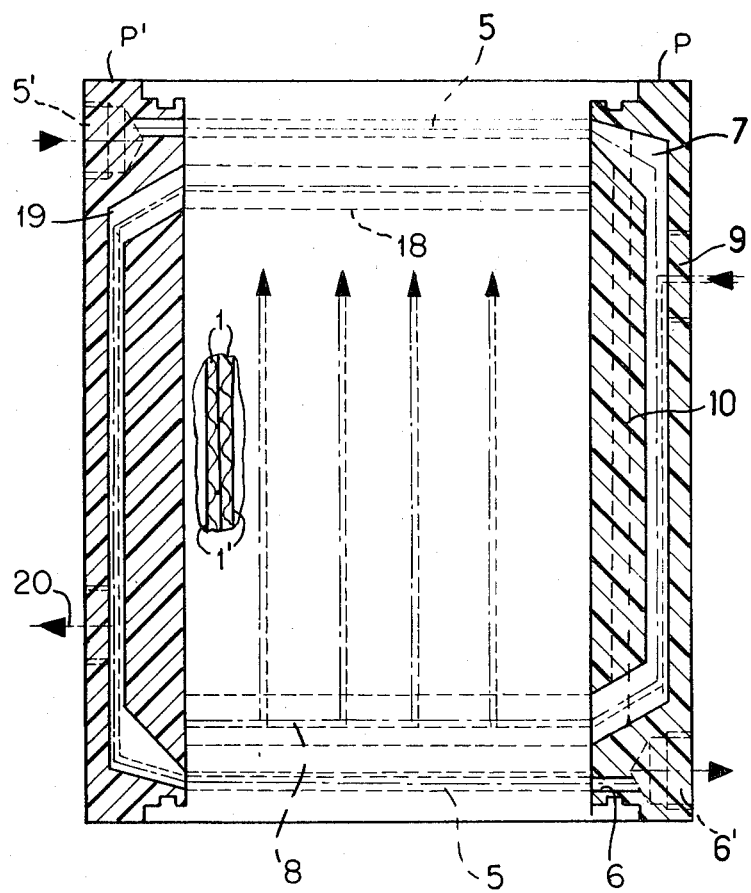
FIG. 3 is a highly schematic, partly fragmentary longitudinal sectional view of a fuel cell battery illustrating the hydraulic circuit and electrolyte supply in accordance with the present invention, taken on III—III of FIG. 2.

The outer end plates are seen in FIG. 3; one of the end plates, specifically the right end plate of FIG. 3 is seen in plan view in FIG. 2. It is formed with openings and cavities to provide for intercommunication of the electrolyte, on the one hand, of the longitudinal channel 5 and, additionally, with inlets and outlets for supply and removal of electrolyte and charged electrolyte.

Referring to FIGS. 2 and 3: The end plate P is formed with openings 6 which communicate with the channels 5B (FIG. 2) formed in the lower marginal portion 30B of the electrodes. Opening 6 terminates in an outlet 6' which may be connected, for example, to a supply, or removal connection for electrolyte. The plate further is formed with openings which communicate with a pair of adjacent top ducts 5L, 5R. These openings extend into the thickness of the plate P to form cavities 7, 10, therein, the cavities being laterally as well as longitudinally (with respect to the thickness of the plate P) offset with respect to each other, as seen in FIG. 3. Opening, and cavity 7 interconnects top longitudinal channel 5L with the supply ducts 8 which, in turn, connect with one side face, each, of the electrodes of the elementary half-cells. Opening and cavity 7 is further formed with an inlet opening 9. The other top ducts 5R communicate with a second opening and cavity 10, likewise located within the thickness of end plate P and in a zone defined by a plane different from that of cavity and opening 7. Opening and cavity 10 terminates at supply channel 11 which, in turn, communicates with the other face of the electrode to supply the other elementary half-cells of the battery. Opening and cavity 10 can be connected to a supply of charged electrolyte by means of a supply opening 12.

The second plate, P' (FIG. 3) is symmetrically located with respect to the median plane of the battery assembly to interconnect with the channels or ducts 5.

Electrolyte can be applied through openings 5' to be introduced into ducts 5L, 5R, respectively, and then be conducted through opening and cavity 7; additional electrolyte, charged for example with a reactant, or additional reactant, can be introduced through opening 9, the combined electrolyte and charge substance being conducted to ducts 8, from there to be applied over microgrooves 3 to the faces of the electrodes and washed thereover, as schematically indicated in FIG. 3, where the electrolyte path is indicated by a chain dotted line, whereas charged electrolyte path is indicated by a dashed line. The combined electrolyte-charged electrolyte, washing over the respective faces of the electrodes, is removed over channels similar to (but possibly dimensionally different from) grooves 3, to be conducted through openings 17 which, when stacked, form a longitudinally (with respect to the length of the battery assembly) extending duct 18. Duct 18 communicates through a left plate P' with an opening and cavity corresponding to cavity 7, to connect with duct 5B and outlet 6, 6'. Opening 20 which corresponds to opening 9 can also be used as a removal opening for electrolyte or, alternatively, can be plugged by means of a screw plug or the like, or sealed by other suitable means. Electrolyte to be charged with a different type reagent circulates in a similar path, with the difference that top ducts 5R will be connected rather than top ducts 5L. As can be seen from FIG. 3, plate P' can be similar to plate P, and formed with similar ducts, and assembled to a battery upside down with respect to plate P.

The end plates P, P' are preferably made by a lost-wax casting process. A melting-type or soluble core is first provided, around which core the end plate is cast. The end plate may be a plastic resin, which can be cast cold, or hot, reinforced or not, and either hot, or cold polymerized, made of a material which is suitable for use with the chemicals employed in fuel cells as referred to, for example, in the aforementioned references. The end plates may also be made of separate elements, assembled together of various parts and each machined or cast separately and then assembled together to form the cavities; if of plastic, the assembly may additionally include a fusion or heat-sealing or chemical sealing step. The end plates preferably are reinforced by means of metal plates, either cast therein or applied at the outside.

The end plate need not be similar, but could be made with different hydraulic connections to enable change-over of supply and interconnection between the cavities and openings within the end plates and with the respective networks of ducts and channels within the battery itself. By suitable interconnection, and opening or plugging the hole 9, 12, 5' and 6', suitable arrangements for inlet and outlet of electrolyte, and charged electrolyte can readily be obtained. If desired, other fluids than electrolyte can be connected, for example for cleaning, washing or reactivating, or flushing the battery assembly.

The openings 9, 12, are preferably located nonsymmetrically with respect to the major dimension of the electrode, as best seen in FIG. 2; the location is so selected that the openings 9, 12, are closer to ducts 5L, 5R than to the supply channels 8, 11. The longer path of liquid introduced at openings 9, 12 provides for good and thorough mixing of charged electrolyte introduced through openings 9, 12, with carrier electrolyte introduced through openings 5' to ducts 5L, 5R. If openings 9, 12 are used as removal openings (similar to opening 20, in plate P', FIG. 3) the longer passage from duct 18 will likewise provide for thorough mixing of spent reaction products with the electrolyte itself. The plane outline of the cavities or openings 7, 10 within the thickness of the end plates P, P' is preferably of generally trapezoidal shape, as best seen in FIG. 2. Openings 15 (FIGS. 1, 2; not shown in FIG. 3) are formed in the electrode and diaphragm elements, or rather in the marginal portions thereof, and in end plates P, P' and are adapted to have bolts pass therethrough to lock the entire assembly of electrode elements 1, diaphragm elements 1', and the end plates together, into one liquid-tight battery block. The active electrode area may, for example, be approximately 10 cm. square; other physical shapes, or dimensions may be used, and the electrodes need not have the plan form or outline illustrated in the drawings. Various changes and modifications may be made as determined by the specific structure and its size and shape selected by the designer.

What is claimed is:

1. Fuel cell battery having an electrolyte supply and removal system, said battery being assembled of a plurality of thin, sheet-like electrode elements (1) and thin, sheet-like semi-permeable diaphragm elements (1'), stacked, alternately, upon each other;

said elements (1, 1') having marginal portions (30, 30B, 30T) formed with openings (2, 17) therein which, when the elements are stacked, from longitudinal channels (8, 11, 18);

means (3) formed in said marginal portions communicating selected longitudinal channels with the alternate side faces of the electrodes whereby the cooperation of one face of an electrode with one side of a diaphragm will form an elementary half-cell;

said electrolyte supply and removal system comprising additional openings (4, 4') formed in the marginal portions (30B, 30T) of the sheet-like elements which, when the elements are stacked, form longitudinal ducts (5, 5L, 5R) extending longitudinally of the stack and essentially perpendicularly to the median plane of the sheet-like elements, said ducts (5) being out of communication with the space interior of the marginal elements through which said ducts pass;

at least one end place (P) located at the end of the stack of the elements;

a first additional duct (5B) being located at a marginal portion of the elements;

said end plate being formed with a first connection opening (6') and a first opening (6) matching, and in communication with the first longitudinal duct (5B) located at one marginal portion, said first opening being adapted to have electrolyte supplied thereto, or removed therefrom;

a second additional duct (5L) located at another marginal portion of the elements;

said end plate being further formed with a second opening (7) matching and in communication with the second longitudinal duct (5L) located at the other marginal portion, said second opening (7) extending lengthwise within the thickness of the plate (P) and being in communication with the longitudinal channels (8) leading to the means (3) communicating with one side face of the electrodes (1);

a second connection opening (9) formed through said plate (P) and communicating with said second opening (7) and adapted to have electrolyte charged with a reactant of one type supplied thereto;

a third duct (5R) being located at another marginal portion of the elements;

said end plate (P) being formed with a third opening (10) extending lengthwise within the thickness of the plate, out of communication with said second opening (7) and in communication with the longitudinal channels (11) leading to the means (3) communicating with the other side faces of the electrodes (1);

and a third connection opening (12) formed through the end plate and communicating with said third opening (10) and adapted to have electrolyte charged with reactant of another type applied thereto.

2. Battery according to claim 1, including a second plate (P') similar to said plate (P) and establishing interconnection of said ducts and channels.

3. Battery according to claim 1, wherein said openings (7, 10) extend longitudinally within the thickness of said plate (P) and comprise a pair of cavities located in planes offset relative to each other with respect to the thickness of the plate.

4. Battery according to claim 1, including a second plate (P') located at the other end of the stack of elements, said second plate being formed with openings interconnecting with the longitudinal ducts and channels (5, 8, 11, 18) adapted to have electrolyte supplied thereto and removed therefrom;

said second plate (P') being further formed with a first cavity (19) located within the thickness of said second plate, said first cavity interconnecting with the removal ducts (18) and communicating with all the one side faces of the electrode elements of the elementary half-cell;

said second plate being further formed with a second cavity located within the thickness of the second plate, said second cavity interconnecting with the removal ducts and communicating with all the other side faces of said electrode elements of the elementary half-cell;

and means formed in said second plate communicating with said first and second cavities to permit removal of electrolyte therefrom.

5. Battery according to claim 1, wherein the second and third connection openings (9, 12) terminate within the openings (7, 11) formed within the thickness of the first plate (P) at a point closer to the second longitudinal ducts (5L, 5R) then the longitudinal channels (8, 11) communicating with the side faces of the electrodes.

6. Battery according to claim 1, wherein both the second and third additional ducts (5L, 5R) are located adjacent each other at one marginal portion;

said first ducts (5B) are located diametrically opposite said second and third ducts with respect to the median plane of the elements (1, 1').

7. Battery according to claim 1, wherein the plane outline of said electrodes and marginal portions is essentially rectangular or square;

and wherein both the second and third additional ducts (5L, 5R) are located adjacent each other at one side of the marginal portions and said first ducts (5B) are located at diametrically opposite sides in the marginal portions.

8. Battery according to claim 1, wherein the end plate (P) is formed of a single plastic molding.

9. Battery according to claim 2, wherein both of said end plates (P, P') are formed of similar single plastic moldings, said end plates being assembled to the stack of elements with their orientation reversed.

References Cited

UNITED STATES PATENTS

| | | | |
|---|---|---|---|
| 3,278,336 | 10/1966 | Uline et al. | 136—86 R |
| 3,484,298 | 12/1969 | Nichols | 136—86 R X |
| 3,518,122 | 6/1970 | Warszawski | 136—86 R |

ALLEN B. CURTIS, Primary Examiner

UNITED STATES PATENT OFFICE
CERTIFICATE OF CORRECTION

Patent No. 3,690,954                    Dated September 12, 1972

Inventor(s) B. WARSZAWSKI et al

It is certified that error appears in the above-identified patent and that said Letters Patent are hereby corrected as shown below:

Column 1, line 37, the date "Mar. 15, 1972" should be --March 10, 1971.--.

In Claim 1, Column 6, line 24, the word "from" should be --form--.

Signed and sealed this 8th day of May 1973.

(SEAL)
Attest:

EDWARD M. FLETCHER, JR.
Attesting Officer

ROBERT GOTTSCHALK
Commissioner of Patents